Dec. 9, 1941.   W. T. STALTER   2,265,615

SEALING MEANS FOR COFFEE BREWERS

Filed March 1, 1940

INVENTOR
Waldo T. Stalter.
BY
Harness, Dickey & Pierce,
ATTORNEYS.

Patented Dec. 9, 1941

2,265,615

UNITED STATES PATENT OFFICE 2,265,615

SEALING MEANS FOR COFFEE BREWERS

Waldo T. Stalter, Goshen, Ind., assignor to Western Rubber Company, Goshen, Ind., a corporation of Indiana Application March 1, 1940, Serial No. 321,751

5 Claims. (Cl. 53—3)

This invention relates to seals for coffee makers, and particularly relates to seals for coffee makers of the type including an upper and lower bowl, usually made of glass, in which the upper bowl has a depending stem which extends into the lower bowl. In such coffee makers, the coffee is placed in the upper bowl and rests upon a filter, while water is placed in the lower bowl and is heated to boiling. The steam pressure above the water level forces the boiling water up through the tube into the upper bowl where the coffee is steeped. When the heat is removed from the lower bowl, the steam in the lower bowl is condensed and the pressure is thereby reduced sufficiently to permit the liquid from the upper bowl to return through the filter.

One of the primary objects of the present invention is to provide an improved seal between the upper and lower bowls so as to prevent loss of pressure from the lower bowl.

Another object of the invention is to provide an improved sealing means for coffee makers of the type mentioned in which the lower bowl has a neck of relatively large diameter, in which the seal has an axial passage therethrough of a diameter greater than the length of the passage.

Another object of the invention is to provide an improved sealing means for coffee makers of the type mentioned having a plurality of ribs formed on the outer surface of the lower portion thereof so that a tight seal is effected when the parts are assembled.

Other objects of the invention will become apparent from the following specification, the drawing relating thereto and from the claims hereinafter set forth.

In the drawing, in which like numerals are used to designate like parts in the several views throughout:

Figure 1:
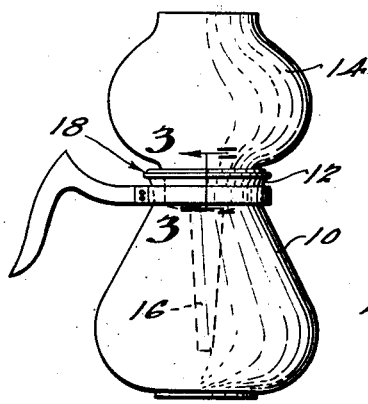
Fig. 1 is an elevational view of a coffee maker having a seal associated therewith embodying features of the present invention.
Figure 2:
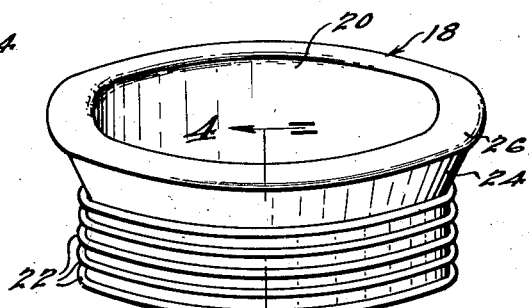
Fig. 2 is an enlarged perspective view of the seal illustrated in Fig. 1.
Figure 4:
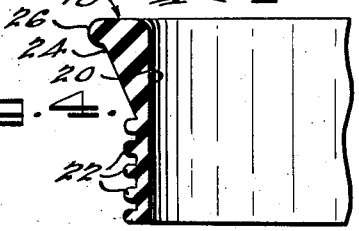
Fig. 4 is a fragmentary, cross-sectional view taken substantially along the line 4—4 of Fig. 2.
Figure 3:
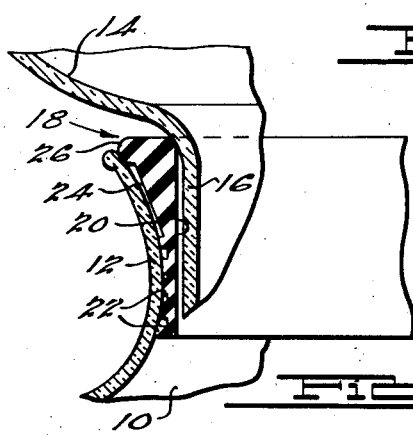
Fig. 3 is an enlarged, fragmentary, cross-sectional view taken substantially along the line 3—3 of Fig. 1.

In the handling and use of coffee makers of the type mentioned above, the upper bowl is fixed to the lower bowl during the coffee making operation and during such operation it is necessary that an effective seal be maintained between the two bowls. After the coffee has been made, and is disposed within the lower bowl, it is necessary to remove the upper bowl; and the removal of such upper bowl together with the seal is effected relatively easily through the constructions of the present invention. At the same time the seal between the bowl is effectively maintained during the coffee making operation. It is also pointed out that the present invention is particularly adapted to coffee makers in which the lower bowl has a relatively wide neck. In prior constructions the lower bowl has a relatively thin neck and the cleaning of such bowl has been relatively difficult. By using a bowl having a neck of relatively large diameter, such bowl may be easily cleaned. When such a bowl is used the sealing of the neck presents a more difficult problem than with the prior narrow necks because the area which must be sealed is considerably larger.

For a better understanding of the invention, reference may be had to the drawing and particularly to Figs. 1 to 4 thereof in which one embodiment of the present invention is illustrated. A coffee maker is shown comprising a lower bowl 10 having a relatively wide neck 12. An upper bowl 14 has a lower cylindrical portion 16 of reduced diameter and a further reduced portion 16 forming a depending, tubular stem which extends downwardly into the lower bowl 10 when the parts are assembled. The portion 16 is disposed within the neck 12 when the parts are assembled and a seal generally indicated at 18 is disposed between the neck 12 and the portion 16.

The seal 18 is formed of a yielding material such as live or soft rubber and is generally tubular in shape. The seal 18 has an axial passage 20 therethrough which is of uniform diameter throughout its length and in which the diameter is greater than the length of the passage. The reduced portion 16 is adapted to be received within the axial passage 20 and engages the seal within the axial passage so that pressure may not escape therealong.

The outer surface of the seal 18 is constructed to provide an external sealing area receivable within the lower bowl neck 12. The lower portion of the seal 18 is relatively thin as compared with the upper portion thereof and has a plurality of annular ribs 22 formed thereon which form grooves therebetween. The ribs 22 are resilient and are adapted to resiliently bear against the inner wall of the neck 12 at a plurality of vertically spaced lines therearound. By providing this resilient engagement of the ribs with the inner wall of the neck at a plurality of spaced lines, an effective seal is provided, while at the same time the seal 18 may be readily disengaged from the neck.

The upper portion of the seal is tapered outwardly as indicated at 24 and terminates in an annular head 26 which is adapted to bear against the inner wall of the neck 12 adjacent the top thereof. The outwardly tapered portion 24 provides a solid upper portion of substantial body as compared with the relatively thin lower portion thereof which body forms a substantial base for the relatively thin lower portion so that the relatively thin lower portion is backed up for proper bearing engagement with the inner wall of the neck 12. The solid upper portion also provides sufficient body so that the seal may be readily removed from the neck.

While the ribs 22 are illustrated as being annular, it is to be understood that the same effect could be obtained by forming a spiral rib in which the ribs were relatively closely spaced together, in which event an effective seal would be obtained and such a structure would be the equivalent of the annular rib specifically shown.

Figure 5:
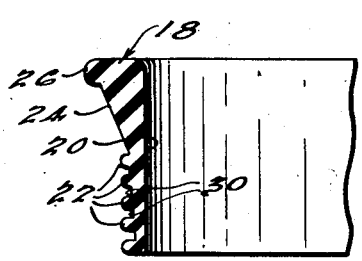
Fig. 5 is a view similar to Fig. 4 illustrating a modified form of the present invention.

In Fig. 5 a modified embodiment of the present invention is illustrated in which the grooves 30 disposed between the ribs 22 are of progressively increasing depth towards the bottom of the seal. The outer peripheries of the ribs 22 have substantially the same diameters so that the ribs are of progressively increasing heights towards the bottom of the seal. The effect of this is that the lowermost ribs are more resilient than the uppermost ribs, and such a construction in which the resiliency of the ribs progressively decreases from the bottom toward the top provides an effective sealing means which may be readily removed when desired.

Figure 6:
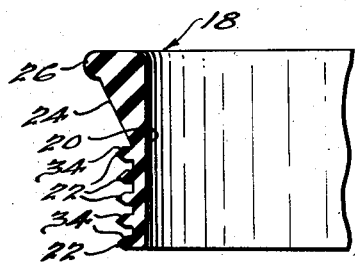
Fig. 6 is another view similar to Fig. 4, illustrating another modified form of the present invention; and, Fig. 7 is another view similar to Fig. 4, illustrating another modified form of the present invention.

In Fig. 6 another modified form of the invention is illustrated in which the ribs 22 have feathered edges 34. Such feathered edges 34 provide resilient tips on the ribs which resiliently bear against the inner wall of the neck 12 but in which the area of contact is substantially small. Such small area of contact is sufficient to provide an effective seal but at the same time assists materially in permitting the removal of the seal from the lower bowl.

Figure 7:
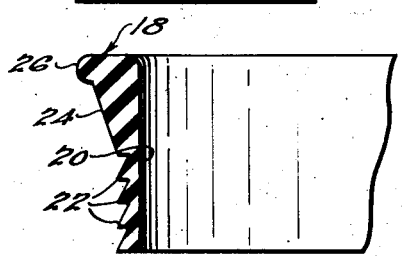

In Fig. 7 another modified form of the invention is illustrated in which the ribs 22 are of triangular section, the upper and lower faces of each of which meet in a line to form a sharp and flexible sealing edge. The lower faces are preferably disposed approximately in a plane perpendicular to the axis of the seal and the upper faces are inclined axially and inwardly at a material angle to the lower faces. This form of rib is particularly effective as a squeegee in removing any water or other material from the neck of the brewer when being applied thereto, thus providing a dry surface for contact between the seal and the neck and reducing the tendency of the seal to become inadvertently displaced in service.

Those features of the seals of the present invention which contribute toward the ready removal of the seal from the bowl, while at the same time maintaining an effective seal during the coffee making operation, are quite important when it is realized that the top bowl and the seal are removed while the lower bowl is full of hot coffee and while the upper bowl is still comparatively hot.

Formal changes may be made in the specific embodiments of the invention disclosed without departing from the spirit and substance of the invention, the scope of which is commensurate with the appended claims.

What is claimed is:

1. A seal for coffee makers or the like comprising an annular seal of yieldable material having an external sealing area receivable in a lower bowl neck and having an axial passage adapted to receive and seal an upper bowl portion, said axial passage being of substantially uniform diameter throughout its length, the lower portion of said seal being relatively thin compared to the upper portion thereof, said lower portion having a plurality of annular ribs formed on the outer surface thereof, the grooves between said ribs being of varying depth, and said upper portion being tapered outwardly.

2. A seal for coffee makers or the like comprising an annular seal of yieldable material having an external sealing area receivable in a lower bowl neck and having an axial passage adapted to receive and seal an upper bowl portion, said axial passage being of substantially uniform diameter throughout its length, the lower portion of said seal being relatively thin compared to the upper portion thereof, said lower portion having a plurality of annular ribs formed in the outer surface thereof, the grooves between said ribs being of progressively increasing depth towards the lower end of said seal, and the upper portion of said seal being tapered outwardly.

3. A seal for coffee makers or the like comprising an annular seal of yieldable material and having an external sealing area receivable in a lower bowl neck and having an axial passage adapted to receive and seal an upper bowl portion, said axial passage being of substantially uniform diameter throughout its length and having a diameter greater than the length of the passage, the lower portion of said seal being relatively thin compared to the upper portion thereof, said lower portion having a plurality of annular ribs formed on the outer surface thereof, the grooves between said ribs being of progressively increasing depth towards the bottom of said seal, and said upper portion being tapered outwardly.

4. A seal for coffee makers or the like comprising an annular seal of yieldable material having an external sealing area receivable in a lower bowl neck and having an axial passage adapted to receive and seal an upper bowl portion, the lower portion of said seal being relatively thin compared to the upper portion thereof, said lower portion having a plurality of axially spaced annular ribs projecting outwardly from the outer surface thereof, said ribs being resilient and the lowermost of said ribs being more readily deformable under pressure than the uppermost of said ribs.

5. A seal for coffee makers or the like comprising an annular seal of yieldable material having an external sealing area receivable in a lower bowl neck and having an axial passage adapted to receive and seal an upper bowl portion, the lower portion of said seal being relatively thin compared to the upper portion thereof, said lower portion having a plurality of annular ribs formed on the outer surface thereof, said ribs being resilient and varying in dimension from one end of said seal toward the other end thereof whereby the degree of resiliency of said ribs decreases from the lower ribs toward the upper rib.

WALDO T. STALTER.